Patented Sept. 6, 1932

1,876,411

UNITED STATES PATENT OFFICE

ALFRED W. GREGG AND RAYMOND H. FRANK, OF COLUMBUS, OHIO, ASSIGNORS TO THE BONNEY-FLOYD COMPANY, OF COLUMBUS, OHIO, A CORPORATION OF OHIO

WEAR RESISTING FERROUS ALLOY

No Drawing. Application filed March 24, 1931. Serial No. 525,032.

This invention relates to a novel and improved wear resisting ferrous alloy which we have developed for use in the construction and formation of machine parts that are, in use, subjected to friction, abrasion and other conditions tending to wear and render the same unfit for efficient service.

It has long been known that, for parts of machinery which must withstand severe wear, abrasion and shock, a relatively soft body of material such as steel, coated or surfaced with a much harder material, gives far superior results. The relatively softer body material has ideal properties to withstand shock without fracture, while the very hard surface will withstand the abrasion and wear to which it may be subjected. Cases in which our invention is especially applicable are, among many others, dipper teeth, bucket lips, tool points, well drilling bits, conveyor parts, crushing rolls and so forth. In most cases these parts are made up of a relatively soft base metal such as cast, rolled or forged carbon or alloy steel which has inferior abrasion resistant properties. Our invention has particular reference to a material for applying a surface or coating on such cast, rolled or forged material to greatly increase its useful life under conditions of severe service.

The alloy to which this invention refers may be cast in suitable form to cover and protect the parts subjected to wear by attaching it thereto by welding, mechanical means or it may be prepared in the form of welding rod and applied to these parts by any welding process such as electric arc welding, oxy-acetylene welding and the like. The latter method is usually preferred, but our invention is not to be limited to this preferred method of application.

A composition which we have used successfully is as follows:

An alloy of approximately the following composition:

| | Per cent |
|---|---|
| Nickel | 30.00 |
| Chromium | 15.00 |
| Tungsten | 15.00 to 20.00 |
| Carbon | 1.00 to 3.00 | the balance being iron except for impurities such as phosphorus and sulphur, which are incidental to the manufacture of the alloy.

Permissible variations from the above are provided in the following table:

| | Per cent |
|---|---|
| Nickel | 15.00 to 35.00 |
| Chromium | 10.00 to 25.00 |
| Tungsten | 10.00 to 25.00 |
| Vanadium | 1.00 to 5.00 |
| Copper | 1.00 to 5.00 |
| Aluminum | 1.00 to 10.00 |
| Molybdenum | .50 to 5.00 |
| Carbon | .50 to 4.00 | the balance being iron except for incidental impurities. With a carbon content lower than 1%, the alloy is machinable. The alloy has been found to be capable of resisting corrosive attacks of acids and all other forms of corrosion.

One of the outstanding features of this alloy resides in the fact that it fuses at a relatively low temperature, considerably below the fusing temperature of other hardening alloys now in use for similar purposes. This low fusing temperature is of very great importance in the matter of avoiding injury to the relatively softer materials to which the alloy is applied. Again, the alloy is both economical to produce and apply and its application to a softer body of metal increases many times the ordinary life of the latter with accompanying economy in the matter of maintaining a machine so protected in prolonged use and operation. This last factor is of considerable importance in the operation of many large machines wherein the time required to replace worn parts is of far greater economic importance than the mere value of the worn or substituted parts.

While the invention has been described in detail, particularly with reference to the matter of the specific composition and preparation of the materials entering into the formation of our improved alloy, yet it will be understood that we do not limit ourselves to the exact formula given but reserve the right to employ such variations or equivalents that can be said to fall within the scope and spirit of the following claims.

What is claimed is:

1. As a new composition of matter, an alloy of analysis having substantially the following range: nickel 15.00% to 35.00%, chromium 10.00% to 25.00%, tungsten 10.00% to 25.00%, vanadium 1.00% to 5.00%, copper 1.00% to 5.00%, aluminum 1.00% to 10.00%, molybdenum .50% to 5.00%, carbon .50% to 4.00%, and the principal portion of the remainder iron.

2. A welding rod made from an alloy as set forth in claim 1.

In testimony whereof we affix our signatures.

ALFRED W. GREGG.
RAYMOND H. FRANK.